United States Patent
Gotze et al.

(10) Patent No.: US 9,992,031 B2
(45) Date of Patent: Jun. 5, 2018

(54) DARK BITS TO REDUCE PHYSICALLY UNCLONABLE FUNCTION ERROR RATES

(71) Applicant: Intel Corporation, Santa Clara, CA (US)

(72) Inventors: Kevin Gotze, Hillsboro, OR (US); Gregory Iovino, Portland, OR (US); David Johnston, Beaverton, OR (US); Patrick Koeberl, Alsbach-Haenlein (DE); Jiangtao Li, Beaverton, OR (US); Wei Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 14/040,337

(22) Filed: Sep. 27, 2013

(65) Prior Publication Data

US 2015/0092939 A1    Apr. 2, 2015

(51) Int. Cl.
*H04L 9/34* (2006.01)
*H04L 9/08* (2006.01)
*H04L 9/32* (2006.01)
*G09C 1/00* (2006.01)

(52) U.S. Cl.
CPC .......... *H04L 9/34* (2013.01); *G09C 1/00* (2013.01); *H04L 9/0866* (2013.01); *H04L 9/3278* (2013.01); *H04L 2209/12* (2013.01)

(58) Field of Classification Search
CPC ... H04L 9/3278; H04L 9/0866; H04L 9/0861; G06F 21/73
See application file for complete search history.

(56) References Cited

U.S. PATENT DOCUMENTS

| | | | | |
|---|---|---|---|---|
| 7,681,103 B2 * | 3/2010 | Devadas | ........... | G06F 21/31 714/752 |
| 8,370,787 B2 * | 2/2013 | Koushanfar | ........... | G06F 21/577 703/14 |
| 8,694,778 B2 * | 4/2014 | Teuwen | ........... | H04L 9/3278 713/168 |
| 8,750,502 B2 * | 6/2014 | Kirkpatrick | ........... | H04L 9/0866 380/44 |
| 8,782,396 B2 * | 7/2014 | Ziola | ........... | G06F 21/31 713/155 |
| 8,848,477 B2 * | 9/2014 | Schrijen | ........... | G06F 7/588 365/185.04 |
| 8,867,739 B2 * | 10/2014 | Danger | ........... | G01R 31/31719 380/44 |
| 2003/0204743 A1 * | 10/2003 | Devadas | ........... | G06F 21/31 726/9 |
| 2006/0209584 A1 * | 9/2006 | Devadas | ........... | G06F 21/31 365/52 |
| 2006/0210082 A1 * | 9/2006 | Devadas | ........... | G06F 21/31 380/277 |
| 2006/0221686 A1 * | 10/2006 | Devadas | ........... | G06F 21/31 365/185.03 |

(Continued)

*Primary Examiner* — Tae K Kim
(74) *Attorney, Agent, or Firm* — Nicholson De Vos Webster & Elliott LLP

(57) ABSTRACT

Embodiments of an invention for using dark bits to reduce physically unclonable function (PUF) error rates are disclosed. In one embodiment, an integrated circuit includes a PUF cell array and dark bit logic. The PUF cell array is to provide a raw PUF value. The dark bit logic is to select PUF cells to mark as dark bits and to generate a dark bit mask based on repeated testing of the PUF cell array.

19 Claims, 3 Drawing Sheets

(56) References Cited

U.S. PATENT DOCUMENTS

| | | | | |
|---|---|---|---|---|
| 2006/0271792 A1* | 11/2006 | Devadas | G06F 21/31 | 713/189 |
| 2006/0271793 A1* | 11/2006 | Devadas | G06F 21/31 | 713/189 |
| 2009/0222672 A1* | 9/2009 | Clarke | G06F 21/31 | 713/189 |
| 2010/0031065 A1* | 2/2010 | Futa | H03K 3/0315 | 713/194 |
| 2011/0055649 A1* | 3/2011 | Koushanfar | H04L 9/3278 | 714/729 |
| 2012/0066571 A1* | 3/2012 | Marinet | G06F 21/73 | 714/773 |
| 2012/0072737 A1* | 3/2012 | Schrijen | H04L 9/3278 | 713/189 |
| 2012/0183135 A1* | 7/2012 | Paral | H04L 9/0866 | 380/44 |
| 2012/0293354 A1* | 11/2012 | Suzuki | H03K 3/84 | 341/173 |
| 2012/0324310 A1* | 12/2012 | Oshida | H04L 9/3278 | 714/755 |
| 2013/0202107 A1* | 8/2013 | Danger | G01R 31/31719 | 380/44 |
| 2013/0322617 A1* | 12/2013 | Orshansky | H04L 9/3278 | 380/28 |
| 2014/0033330 A1* | 1/2014 | Fainstein | G06F 21/30 | 726/30 |
| 2014/0218067 A1* | 8/2014 | Li | H03K 19/17768 | 326/8 |
| 2014/0266297 A1* | 9/2014 | Mathew | H03K 19/00369 | 326/9 |
| 2014/0325237 A1* | 10/2014 | Van Der Leest | G06F 21/72 | 713/189 |
| 2014/0327468 A1* | 11/2014 | Pfeiffer | H03K 19/003 | 326/8 |
| 2014/0331288 A1* | 11/2014 | Yu | H04L 9/3278 | 726/4 |
| 2015/0059008 A1* | 2/2015 | Fainstein | G06F 21/30 | 726/30 |
| 2015/0192637 A1* | 7/2015 | Falk | G06F 21/55 | 326/16 |
| 2015/0236693 A1* | 8/2015 | Pfeiffer | H03K 19/003 | 326/8 |

* cited by examiner

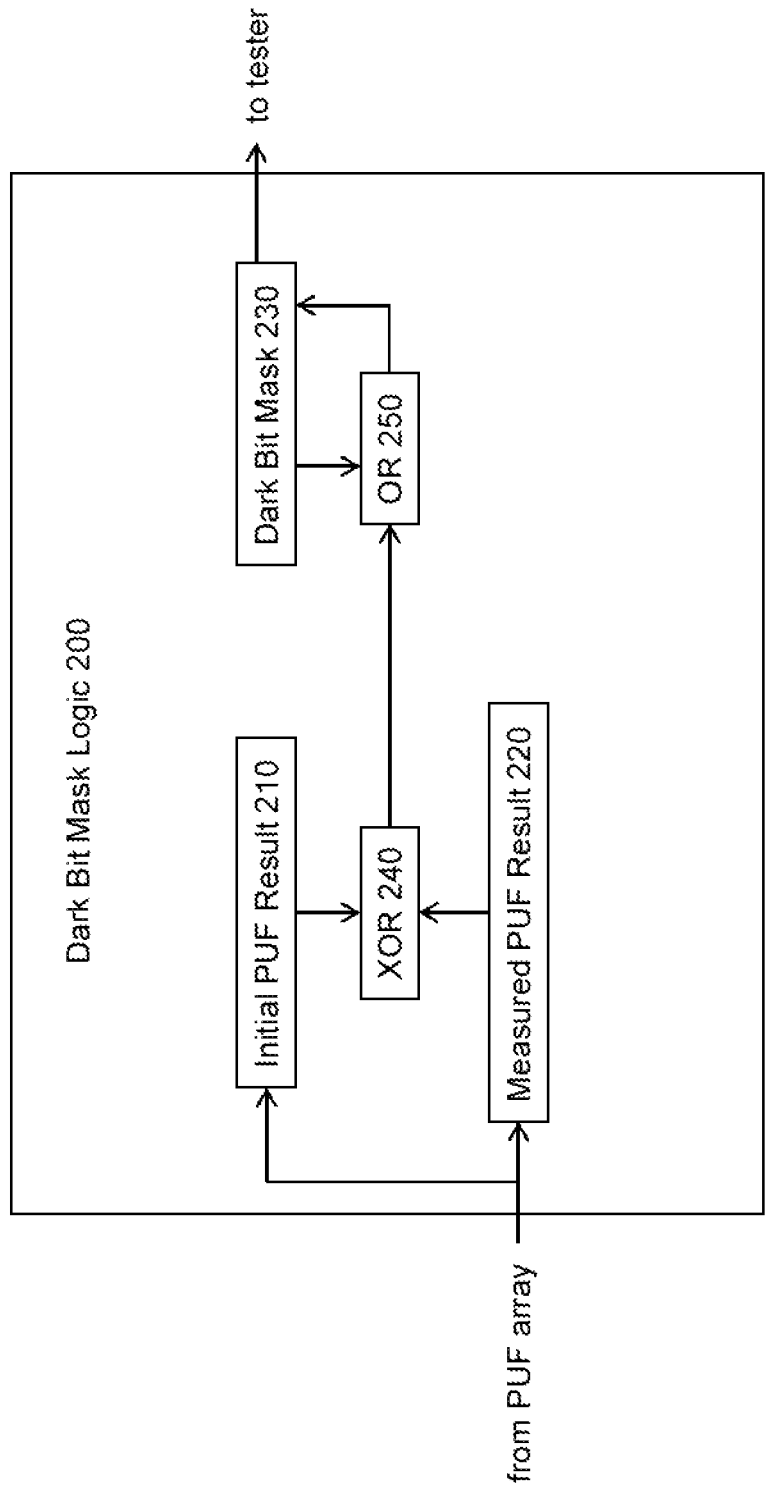

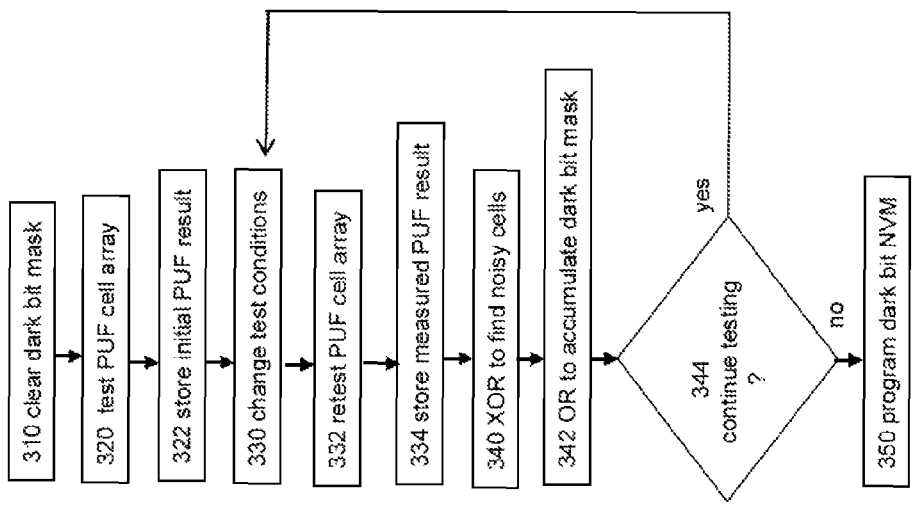

DARK BITS TO REDUCE PHYSICALLY UNCLONABLE FUNCTION ERROR RATES

BACKGROUND

1. Field

The present disclosure pertains to the field of electronic devices, and more particularly, to the field of security in electronic devices.

2. Description of Related Art

Confidential information is stored, transmitted, and used by many electronic devices. Therefore, many such devices include one or more components having one or more cryptographic or other secret keys, which may be used to protect the security of confidential information with encryption or other techniques. Techniques for generating these keys often include the use of a random number source.

BRIEF DESCRIPTION OF THE FIGURES

The present invention is illustrated by way of example and not limitation in the accompanying figures.

FIG. 2 illustrates dark bit logic according to an embodiment of the present invention.

FIG. 3 illustrates a method for determining a dark bit mask according to an embodiment of the present invention.

DETAILED DESCRIPTION

Figure 1:
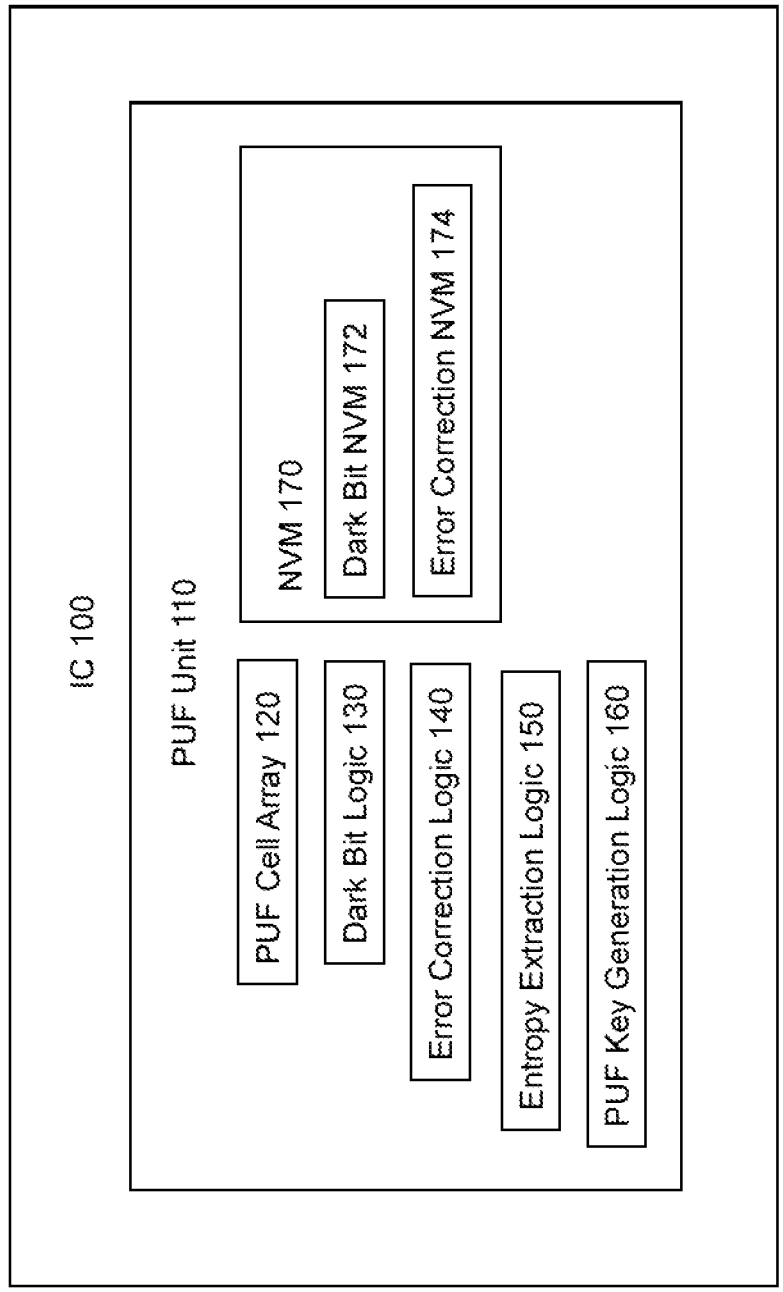
FIG. 1 illustrates an integrated circuit using dark bits to reduce physically unclonable function error rates according to an embodiment of the present invention.

Embodiments of an invention providing for using dark bits to reduce physically unclonable function en or rates are described. In this description, various specific details, such as component and system configurations, may be set forth in order to provide a more thorough understanding of the present invention. It will be appreciated, however, by one skilled in the art, that the invention may be practiced without such specific details. Additionally, to avoid unnecessarily obscuring the present invention, some well-known structures, circuits, and other features have not been shown in detail.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the specification and claims, unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner.

As mentioned in the background section, the generation of cryptographic keys often includes the use of a random number source. A physically unclonable function (PUF) is a desirable random number source because it may be used to provide a unique, repeatable, and unpredictable random value within an integrated circuit. In this description, the tem "PUF key" may be used to mean any value generated by or derived from a PUF.

FIG. 1 illustrates integrated (IC) 100, which uses dark bits to reduce PUF error rates according to an embodiment of the present invention. IC 100 may represent any other component to be used in any electronic device.

For example, IC 100 may represent or more processors integrated on a single substrate or packaged within a single package, each of which may include multiple threads and/or multiple execution cores, in any combination. Each processor may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller.

IC 100 may include PUF unit 110 to generate one or more PUF keys that may be used for any purpose by IC 100, such as for use directly as one or more cryptographic or other keys and/or for use in the generation or derivation of one or more cryptographic or other keys. The PUF key(s) generated by PUF unit 110 may be of any size, i.e., number of bits. PUF unit 110 may include PUF cell array 120, dark bit logic 130, error correction logic 140, entropy extraction logic 150, PUF key generation logic 160, and non-volatile memory (NVM) 170. Embodiments of the present invention may omit error correction logic 140, entropy extraction logic 150, and/or PUF key generation logic 160.

PUF cell array 120 may include any number of PUF cells to provide a unique, repeatable, and unpredictable value. For example, PUF cell array 120 may take advantage of variations in IC process parameters such as dopant concentrations, line widths, and layer thicknesses, which may manifest themselves as differences in timing behavior between multiple instances of the same circuit on different ICs. Therefore, each instance of a PUF cell may provide a unique, repeatable, and unpredictable response when measured or challenged. Furthermore, because manufacturing variations are random in nature, cloning or creating a physical copy of any particular instance of a PUF cell or PUF cell array is extremely difficult.

Any type of PUF cell may be used in PUF cell array 120, including but not limited to an arbiter PUF, a ring oscillator PUF, a static random access memory (SRAM) PUF, and a D-type flip-flop PUF. For example, an SRAM PUF is based on the four-cross coupled transistors of an SRAM cell, which assumes one of two stable states after power-up based on any slight mismatches among the four transistors. The mismatches are the result of variations in the fabrication process, so the power-up state for a single instance of an SRAM cell may be expected to be repeatable, but the distribution of power-up states for multiple instances of an SRAM cell may be expected to be random.

The site of PUF cell array 120 (i.e., number of cells) may be determined based on the size (i.e., number of bits) of the cryptographic and/or other key or keys to be generated or derived. In one embodiment, such a key may be 128 bits; however, the size of PUF cell array 120 may be larger in order to provide for the possibility of discarding noisy bits to reduce the error rate. Embodiments of the present invention may be desired in order to provide for smaller size PUF array than might be required according to known error correction techniques.

Dark bit logic 130 may include any logic, circuitry, or other hardware and/or firmware to provide for the evaluation of the characteristics of one or more PUF cells in PUF cell array 120, to provide for marking as "dark bits" those PUF cells that are determined to not meet stability requirements, and to provide for the screening of dark bits from use in the generation of PUF key(s). Therefore, dark bit logic 130 provides for discarding or replacing noisy PUF bits in order to reduce the error rate of PUF key generation. NVM 170 may be used by dark bit logic 130 to store information, such as a mask or a map, to be used to mark (e.g., during fabrication and/or testing of IC 100) and later identify (e.g., during use of IC 100) dark bits, as further described below.

Error correction logic 140 may include any logic, circuitry, or other hardware and/or firmware to provide for correcting errors in the generation of PUF keys from PUF cell array 120. Any known error correction technique, such as an error correcting code (ECC) may be used. NVM 170 may be used to store information, such as ECC data, gathered during the fabrication and/or testing of IC 100 to be later used by error correction logic 140 to correct errors during the use of IC 100.

Entropy extraction logic 150 may include any logic, circuitry, or other hardware and/or firmware to provide for increasing entropy in the generation of PUF keys from PUF cell array 120. Entropy extraction logic 150 may provide for increasing entropy in order to offset any loss of entropy resulting from the use of error correction logic 140. Any known entropy extraction technique, such as one based on a block cipher, a message authentication code (MAC), a hash function, or an Advanced Encryption Standard (AES) Cipher-based MAC, may be used.

PUF key generation logic 160 may include any logic, circuitry, or other hardware to provide for the generation of one or more PUF keys from the content or output of PUF cell array 120, as it may be post-processed by dark bit logic 130, error correction logic 140, and/or entropy extraction logic 150. For example, PUF key generation logic 160 may measure or challenge PUF cell array 120 to produce one or more raw values that may be filtered, conditioned, processed, or otherwise manipulated by dark bit logic 130, error correction logic 140, entropy extraction logic 150, and/or PUP key generation logic 150 to further produce one or more PUF keys in response. PUF key generation logic 160 may also be challenged itself, as part of a challenge-response protocol, in which case PUF key generation logic 160 may respond with one or more PUF keys based on the content or output of PUF cell array 120, as post-processed by dark bit logic 130, error correction logic 140, entropy extraction logic 150, and/or PUF key generation logic 150. In either case, one or more values (i.e., sets of bits) provided in a challenge may be used in the generation and/or post-processing of the raw value(s) from PUF cell array 120.

NVM 170 may include any type of non-volatile memory, such as fuses or programmable read-only memory, which may be used to store information during the fabrication and/or testing of IC 100 for use by dark bit logic 130 and/or error correction logic 140 during the use of IC 100. For example, NVM 170 may include dark bit NVM 172 (as further described below) and error correction NVM 174.

The size of NVM 170 may be determined based on the size of the cryptographic and/or other key or keys to be generated or derived and/or a desired or expected error rate limit. Embodiments of the present invention may be desired in order to provide for smaller size of NVM 170 than might be required according to known error correction techniques.

Returning to dark bit logic 130, PUF cell array 120 may be tested multiple times, under differing voltage and temperature conditions, in order to determine which PUF cells are to be marked as dark bits. If the measured bit value ('0' or '1') of a particularly PUF cell is noisy (i.e., not consistent), it may be marked as a dark bit. This testing may be performed by the manufacturer of vendor of IC 100 before sale or release of IC 100 to a customer user. However, it is desirable for the testing process to not reveal information that may allow the manufacturer of IC 100 to determine the PUF key(s) to be generated by PUF unit 110 when in use by a customer, for that would compromise the security benefits provided to the customer by the use of the PUF keys. Dark bit logic 130 may provide for the testing of PUF cell array 120 and determination and marking of dark bits without leaking such information.

FIG. 2 illustrates dark bit mask logic 200, an embodiment of which may be used within dark bit logic 130 in IC 100 in FIG. 1. Dark bit mask logic 200 provides for determining which bits of PUF cell array 120 to mark as dark, without leaking PUF response information to the tester. Dark bit mask logic 200 includes initial PUF result register 210, measured PUF result register 220, dark bit mask register 230, bitwise exclusive-OR (XOR) gate 240, and bitwise OR gate 250.

Although referred to as registers, initial PUF result register 210, measured PUF result register 220, and dark bit mask register 230 may use any type of storage location in IC 100, such as register bits, cache bits, or other memory bits to store information. The number of bits in each of these registers may be equal to the number of PUF cells in PUF cell array 110 to provide for a one-to-one mapping of a bit in each of these registers to a PUT cell.

The value stored in dark bit mask register 230 and may be used to generate a value to be stored in dark bit NVM 172, which in turn is to be used for error rate reduction during the customer's use of IC 100 as further described below. For example, if the value stored in a particular bit location in dark bit mask register 230 is '1', the corresponding PUT cell has been marked as a dark bit; if the value stored in the particular bit location in dark bit mask register 230 is '0', the corresponding PUF cell has been determined to be satisfactorily stable.

The value to be stored in dark bit mask register 230 may be determined and stored according to method embodiment 300 of the present invention illustrated in FIG. 3. Although method embodiments of the present invention are not limited in this respect, reference may be made to elements of FIGS. 1 and 2 to help describe the method embodiment of FIG. 3. Method 300 may include testing performed by the manufacturer or vendor of IC 100 as part of the fabrication and testing process, before selling or releasing IC 100 to a customer. Method 300 may also include actions performed by the internal operation of IC 100.

In box 310 of method 300, dark bit mask register 230 may be cleared such that the value of each bit is '0'.

In box 320, PUF cell array 120 may be tested under an initial test condition to determine an initial raw PUF value. The initial test condition may include any particular operating voltage, operating temperature, and/or any other controllable operating or environmental condition. In box 322, the initial raw PUF value is stored in initial PUF result register 210.

In box 330, the test condition may be changed, for example, any one or more of the operating voltage, operating temperature, and/or other controllable operating or environmental condition may be changed.

In box 332, PUT cell array 120 may be tested under a new test condition to determine a new raw PUF value. In box 334, the new raw PUF value is stored in measured PUF result register 220.

In box 340, the bitwise XOR of the initial raw PUF value, as stored in initial PUF result register 210, and the new raw PUF value, as stored in measured result register 220, is computed by bitwise XOR gate 240. The output of XOR gate 240 indicates which PUF cells have changed their value between the initial measurement and the new measurement, and may therefore be considered noisy.

In box 342, the bitwise OR of the output of XOR gate 240 and the dark bit mask, as stored in dark bit mask register 230, is computed by OR gate 250, and fed back into dark bit mask register 230. Therefore, dark bit mask register 230 may accumulate a dark bit mask over multiple testing conditions, i.e., indicate which PUF cells have been found to be noisy based on one or more iteration of testing.

In box 344, it is determined whether to repeat boxes 330 to 342, for example, based on a parameter chosen based on a desired or expected error rate limit, an allowable dark bit limit, the cost of testing, and/or any other factor.

In box 350, the output of dark bit mask register 230 may be used to program dark bit NVM 172, for example by the tester. Note that none of the content of initial PUF result register 210, the content of measured result register 220, the output of XOR gate 240, the output of OR gate 250, or any other values used to generate the output of dark bit mask register 230 are revealed or leaked to the tester.

Note also that method 300 provides for testing PUF cell array 120 under different conditions during the same testing operation, i.e., without powering off the device. For example, PUF cell array 120 may be tested under any of nine combinations (corner conditions) of three voltage levels (e.g., high of 1.32V, normal of 1.20V, and low of 1.08V) and three temperature levels (e.g., high of 85° C., normal of 25° C., and low of negative 40° C.) to induce noisiness that might otherwise be hidden until IC 100 is used by a customer. Method 300 provides for measuring PUF cell array 120 while transitioning from any one such corner condition to another (for example, changing the operating voltage), which may be more likely to reveal which PUF cells are noisy.

In addition, method 300 may be repeated in a different testing environment. For example, it may be feasible to change operating voltage during testing but not operating temperature. Therefore, box 330 may be used to change operating voltage, and/or IC 100 may be tested using method 300 on separate occasions (e.g., powered down, removed from tester, and/or retested at a different time at a different temperature). For each such test or retest, the output of dark bit mask register 230 may be stored, for example, on a central server. Then, the bitwise OR of each such output may be computed to generate a final dark bit mask to use for programming dark bit NVM 172 during a final testing operation.

In various embodiments of the present invention, the method illustrated in FIG. 3 may be performed in a different order, with illustrated boxes combined or omitted, with additional boxes added, or with a combination of reordered, combined, omitted, or additional boxes. For example, the changing of test conditions in box 330 may be omitted for one or more iterations of the testing in box 332, such that IC 100 is retested under the same conditions. Furthermore, various other embodiments of the present invention are possible.

As a further example, the operation of box 350, using the output of dark bit mask register 230 to program dark bit NVM 172, may be performed according to various approaches in various embodiments of the present invention. For example, certain embodiments may be desired to reduce the size of dark bit NVM 172. Certain embodiments may take advantage of knowledge of the expected raw PUF error rate, for example, that it may be low enough to provide for reducing the size of dark bit NVM 172 by using an approach other than simply storing the dark bit mask in dark bit NVM 172. Some of these embodiments may be used together.

According to one embodiment, an address, index, or other value is stored in dark bit NVM 172 to indicate the location of each dark bit in PUF cell array 120. For example, for a 1024-bit PUF result, suppose that up to 25 PUF cells are to be marked as dark bits. Therefore, the size of dark bit NVM 172 may be 250 bits instead of the 1024 bits that would be required for a mask.

According to one embodiment, PUF cell array 120 may be divided into regions or rows, where the dark bit locations stored in dark bit NVM 172 are only to filter out a particular row. For example, for a 32×32 PUF cell array, assuming one dark bit in each row, each row location may be encoded in five bits, allowing for encoding 32 (non-randomly distributed) dark bits in 160 bits of NVM.

According to one embodiment, the number of dark bits may be limited. For example, the limit may be set at 25 dark bits. If more than 25 dark bits are measured, NVM 172 may be used to store identifying information for 25 of them, which may be chosen according to any approach, such as the first 25 dark bits to be found or the noisiest 25 dark bits. Any remaining dark bits may be corrected using error correction logic 140.

According to one embodiment, during PUF key generation, dark bits may be replaced with a fixed value ('1' or '0'), instead of discarded. For example, if the dark bit mask is stored in NVM 172, the PUF result after dark bit filtering could be calculated as the bitwise OR of the raw PUF result and the dark bit mask, effectively setting each dark bit to a value of '1'. Satisfactory randomness in the result may still be achieved through the use of entropy extraction logic 150.

Thus, embodiments of an invention for using dark bits to reduce PUF error rates have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An integrated circuit comprising:
   a physically unclonable function (PUF) cell array to provide a raw PUF value, the PUF cell array including a plurality of PUF cells; and
   dark bit logic to select a subset of PUF cells of the plurality of PUF cells to mark as dark bits, wherein the dark bit logic is to generate a dark bit mask based on repeated testing of each PUF cell, the dark bit logic including a first register to store a first raw PUF value and a second register to store a second raw PUF value, the first and second registers are unreadable outside the integrated circuit, wherein the dark bit logic is also to replace, for generation of a PUF key, a response from each of the subset of PUF cells marked as dark bits with a value of logical one.

2. The integrated circuit of claim 1, further comprising a non-volatile memory in which to store a dark bit map based on an output of the dark bit logic.

3. The integrated circuit of claim 1, wherein the dark bit logic includes:
a comparator to compare the first raw PUF value to the second raw PUF value.

4. The integrated circuit of claim 3, wherein:
the first raw PUF value is to be measured under a first condition; and
the second raw PUF value is to be measured under a second condition.

5. The integrated circuit of claim 4, wherein the comparator is to select a PUF cell to mark as a dark bit if the comparator determines that the first raw PUF value for the PUF cell is different from the second raw PUF value for the PUF cell.

6. The integrated circuit of claim 3, further comprising a dark bit mask storage location to store the dark bit mask, wherein the comparator has a comparator output, the dark bit mask storage location has a dark bit mask input and a dark bit mask output, and the dark bit masked input is based on a logical OR operation of the comparator output and the dark bit mask output.

7. The integrated circuit of claim 1, further comprising PUF bit error correction logic to correct errors in generating the PUF key based on the raw PUF value.

8. The integrated circuit of claim 1, further comprising PUF bit entropy extraction logic to increase entropy in generating the PUF key based on the raw PUF value.

9. The integrated circuit of claim 1, further comprising PUF key generation logic to generate the PUF key based on the raw PUF value and the dark bit mask.

10. A method comprising:
testing, by a tester, a PUF cell array including a plurality of PUF cells in an integrated circuit to measure a first raw PUF value, wherein the first raw PUF value is not readable outside the integrated circuit;
testing, by the tester, the PUF cell array to measure a second raw PUF value, wherein the second raw PUF value is not readable outside the integrated circuit;
selecting a subset of PUF cells of the plurality of PUF cells to mark as dark bits by comparing the first raw PUF value and the second raw PUF value to generate a first dark bit mask; and
replacing, for generation of a PUF key, a response from each of the subset of PUF cells marked as dark bits with a value of logical one.

11. The method of claim 10, further comprising generating a second dark bit mask based on the first dark bit mask and an output of the comparator.

12. The method of claim 10, further comprising changing test conditions between testing to measure the first raw PUF value and testing to measure the second raw PUF value.

13. The method of claim 12, wherein changing test conditions includes changing operating voltage.

14. The method of claim 12, wherein changing test conditions includes changing test conditions without removing power from the integrated circuit.

15. The method of claim 10, further comprising storing, in a non-volatile memory in the integrated circuit, a dark bit map based on the first dark bit mask.

16. The method of claim 15, wherein the dark bit mask is to include one bit for each PUF cell in the PUF cell array and the dark bit map is to include less than one bit for each PUF cell in the PUF cell array.

17. The method of claim 15, wherein the dark bit map is to include an address for each of a plurality of dark bits in the PUF cell array.

18. The method of claim 15, further comprising using the dark bit map to determine which PUF cells to discard in generation of the PUF key.

19. An apparatus comprising:
an integrated circuit comprising:
a physically unclonable function (PUF) cell array to provide a raw PUF value, the PUF cell array including a plurality of PUF cells, and
dark bit logic to select a subset of PUF cells of the plurality of PUF cells to mark as dark bits, wherein the dark bit logic is to generate a dark bit mask based on repeated testing of each PUF cell, the dark bit logic including a first register to store a first raw PUF value and a second register to store a second raw PUF value, the first and second registers are unreadable outside the integrated circuit,
wherein the dark bit logic is also to replace, for generation of a PUF key, a response from each of the subset of PUF cells marked as dark bits with a value of logical one; and
an integrated circuit tester to test the PUF cell array;
wherein the dark bit logic is to generate the dark bit mask without revealing the raw PUF value to the integrated circuit tester.

* * * * *